June 9, 1959 G. PAUL 2,890,279

SYNCHRONIZATION SIGNAL SEPARATION CIRCUIT

Filed July 21, 1954

INVENTOR:
GUENTHER PAUL,

BY Donald K. Timlie
HIS ATTORNEY.

United States Patent Office 2,890,279

Patented June 9, 1959

2,890,279

SYNCHRONIZATION SIGNAL SEPARATION CIRCUIT

Gunther Paul, Hannover, Germany, assignor to Telefunken Gesellschaft für drahtlose Telegraphie m.b.H., Berlin, Germany, a corporation of Germany Application July 21, 1954, Serial No. 444,843

7 Claims. (Cl. 178—69.5)

This invention relates to a circuit for television receivers for separating the synchronizing signals from the picture content out of the composite signal, i.e., the low-frequency mixture of image signals and synchronizing pulses.

It is desirable that such a circuit have the following characteristics. In spite of the variable input amplitude and the variable image content, the impulses at the output should have as constant an amplitude and width as possible. Such a circuit should also fulfill the requirements that (1) the black level be maintained constant, and (2) the "separation region " be as small as possible. The latter means that the minimum amplitude of the synchronizing impulses on the input side, which is still sufficient to supply a constant output amplitude, must not exceed a certain value. In a good television receiver, the synchronization by the synchronizing signals must take place at such low input amplitudes that even the image content signals will no longer give a useable television image.

It is the object of this invention to provide an improved circuit for separating synchronizing signals.

The manner in which this object is obtained will be understood after the following discussion of the drawings in which.

To what extent the above noted characteristics are obtained simultaneously depends upon which of the known synchronizing methods is used, whether, for example, the differentiation method or the integration method is used in the receiver. The invention shall, therefore, be explained in greater detail in connection with two examples of the two synchronizing methods.

The circuit proposed by the invention sets out from a known circuit in which two triodes, of which the first is cathode-controlled and has a very high plate resistance, are provided for separating the synchronizing signals from the composite signal. The grid of the second triode is directly connected to the plate of the first triode and may be connected either as a plate amplifier only, or as a cathode and plate amplifier, depending upon whether the further synchronization method needs only positive impulses as in the integration method for the separation of the vertical synchronizing pulses, or also negative impulses as when the differentiation method is used.

Accordingly, the grid of the first triode in such a circuit with two triodes is usually supplied with a positive bias from a voltage divider. To render the second triode nonconducting, the cathode of this tube may be given a fixed positive bias, either from a voltage divider, or from a cathode resistance shunted by a capacitor.

Figure 1:
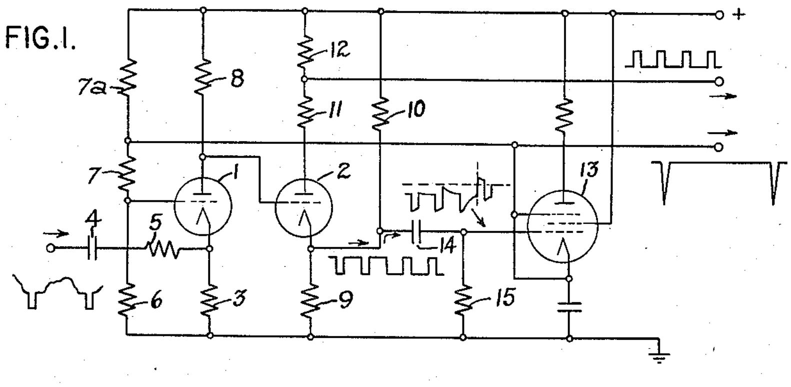
Figure 1 illustrates a form of the invention as it is used in conjunction with a circuit employing differentiation to separate the frame synchronizing pulses from the horizontal synchronizing pulses.

In Figure 1, the two triodes are 1 and 2, which may preferably be mounted in the same tube envelope. The grid of tube 2 is directly connected to the plate of tube 1. The cathode of tube 1, grounded through a resistance 3, is supplied over a coupling capacitor 4 and a small coupling resistance 5 with the composite signal in such a way that the picture content signals are positive and the synchronizing signals are negative. The grid of tube 1 is connected to a resistance voltage divider 6, 7 and 7*a* between ground and the plate voltage source of about 200 volts, which gives it a bias of about +5 volts. The plate resistance 8 of tube 1 is very high, for example, 1 megohm. The separated negative synchronizing impulses may be picked up across the cathode resistance 9 of tube 2.

Figure 3:
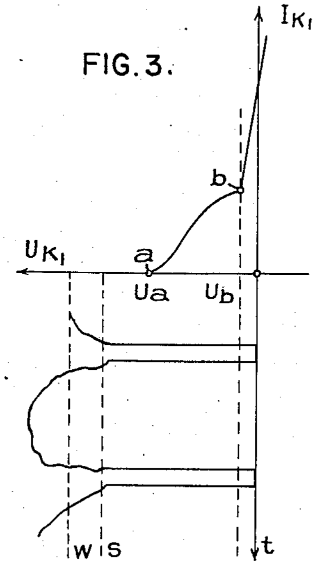
Figure 3 is a graph of a tube characteristic used in explaining the operation of the invention.

Figure 3 shows the cathode current $I_{k1}$ of tube 1 as a function of the cathode voltage $U_{k1}$ for the case when the grid bias is 0, i.e., when the resistance 6 in Figure 1 is short circuited. This characteristic is modulated by the composite signal as shown below the axis of abscissae in Figure 3. The average cathode current produces a bias across the resistance 3 and thus determines the position of the A.-C. axis denoted by *w*. The cathode current begins to flow at a voltage $U_a$ which corresponds to the point *a*. At the voltage $U_b$, the characteristic has a kink which is due to the fact that a grid current begins to flow at this voltage. As can be seen from the shape of the characteristic, a modulation up to cathode voltages considerably lower than $U_b$ is hardly possible because, in this region, the slope of the characteristic is very steep and, therefore, the bias rises sharply and the A.-C. axis is displaced in a positive direction. Hence, the circuit already satisfies one of the above-mentioned requirements that the black level be practically constant when the picture content is variable and the image amplitude is constant. Of course, the amplitude of the control voltage must be large enough to modulate the characteristic up to the point *b*.

The next requirement of a minimum separation region means that even impulses whose amplitude is equal to the difference between the voltages $U_a$ and $U_b$ must modulate the tube until the grid current begins to flow. But as can be seen from Figure 3, only part of the impulse amplitude modulates the triode 1. If it is further assumed that the picture content is black, i.e., that the A.-C. axis W almost coincides with the black level S, the minimum bias is obtained which must be applied when the triode 1 is to be modulated until the grid current begins to flow. It is about 10% lower than the difference $U_a - U_b$ when it is assumed, according to CCIR standards, that the length of the impulse is one tenth of the time interval between two impulses. The average plate current which flows through the resistance 3 when the tube is modulated to the point at which the grid current begins to flow may only be of such a magnitude that the bias will be equal to 0.9 $(U_a - U_b)$. If, as shown in the characteristic of Figure 3, it is assumed that the grid is grounded, the plate current will become considerably larger when the modulation reaches the point where the grid current begins to flow. The bias thus becomes too large, and the A.-C. axis is displaced in the positive direction which corresponds to considerably larger impulse amplitudes than the required minimum separation region to modulate the tube to the point at which the grid current begins to flow. This drawback is remedied by the invention through the grid bias of tube 1. Since the cathode is also positively biased, due to the voltage drop across the resistance 3 produced by the average plate current, the voltage between cathode and grid is reduced. As already mentioned, the cathode must be more positive than the grid by the amount 0.9 $(U_a - U_b)$. When this requirement for the grid bias is fulfilled, a composite signal in which the impulse amplitude is equal to $U_a - U_b$ may already modulate the tube 1 for a picture content "black" up to the point at which the grid current begins to flow. If the picture content is brighter, or the impulse amplitude larger, the grid current will flow, and the average cathode current will rise steeply, as shown by the characteristic, so that the corresponding bias will automatically be generated. Because of the very steep grid characteristic in this region, the impulse peaks are displaced within only very narrow limits.

The further requirement mentioned at the beginning that the output amplitudes of the tube 2 must be absolutely constant while the input amplitudes are variable would also not be accomplished when tube 2 is connected in the usual manner, because when the grid current begins to flow in tube 1, the plate current in tube 2 continues to decrease. Hence, the plate current in tube 2 must become zero even before the grid current begins to flow in tube 1. But a tube operating as a cathode amplifier can never, on its own, become completely non-conducting in the kind of circuit just described, and this is why the invention further proposes to maintain the cathode of tube 2 at a constant positive potential by means of the resistance voltage divider 9, 10. This bias is so selected that even before the grid current begins to flow in tube 1, the cathode in tube 2 will be more positive than the grid by the modulation range of this tube. This makes it possible to cut out a range of constant amplitude from the synchronizing impulse. At the tap of the plate resistance 11, 12 of tube 2 the synchronizing impulses are positive and may be applied directly to the horizontal deflection circuit.

To separate the horizontal impulses from the vertical impulses the differentiation method was used in the example shown in Figure 1. Here separation is accomplished with the help of a pentode 13, in which the time constant of the grid may be chosen (through the proper selection of the capacitor 14 and the grid leak 15) to give a maximum difference between the peaks of the wider picture impulses and that of the line impulses. The bias is so adjusted that only the peak of the picture impulses modulates the tube so that the line impulses are completely separated. This method requires negative impulses at the grid of tube 13, and this is why it is connected to the cathode of tube 2 over the capacitor 14. An advantage of this method is the elimination of pairing of the lines because the line impulses may be completely separated from the picture impulses.

Figure 2:
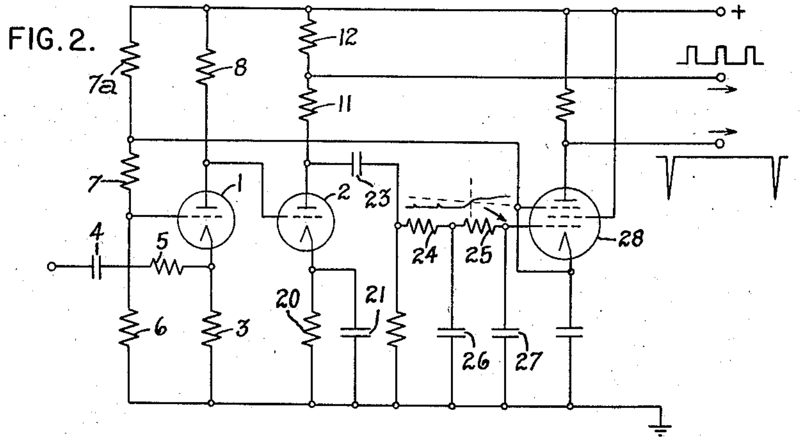
Figure 2 illustrates a form of the invention as it is used in conjunction with a circuit employing integration to separate the frame synchronizing pulses from the horizontal synchronizing pulses.

Figure 2 describes another example of the invention in which the integration method is used to separate the horizontal from the vertical impulses. No negative impulses are required at the output of the separation circuit. For this reason, the positive bias of the cathode of tube 2 is produced by an RC element consisting of the resistance 20 and the capacitance 21, which replace the voltage divider 9, 10 in Figure 1. Otherwise the circuit is practically the same as in Figure 1.

To generate the control impulses for the vertical deflection, the positive synchronizing signal, i.e., the mixture of horizontal and vertical impulses, is picked up at the plate of tube 2 and supplied over a coupling capacitor 23 to a low-pass filter consisting of the series resistances 24, 25 and the shunt capacitances 26 and 27 which integrates the composite signal. It is assumed that the synchronizing signal satisfied the CCIR standard, i.e., the vertical impulse consists of 6 widened horizontal impulses. The time constant of the low-pass filter is such that the sum of the 6 widened impulses forms a single deformed impulse while the horizontal impulses are effectively suppressed. The integrated vertical impulse serves, in the usual manner, to control a pentode 28 whose bias is so adjusted that even the last remnants of the horizontal impulses in the control voltage no longer modulate the tube. To the plate of tube 28 is connected the vertical synchronizing circuit.

While I have illustrated a particular embodiment of my invention, it will of course be understood that I do not wish to be limited thereto, since various modifications both in the circuit arrangement and in the instrumentalities may be made, and I contemplate by the appended claims to cover any such modifications as fall within the true spirit and scope of the invention.

What I claim as new and desire to secure by Letters Patent of the United States is:

1. A circuit for separating synchronizing pulses from a wave train in which the synchronizing pulses occupy a unique amplitude portion of the signal comprising in combination a first electron discharge device having at least a plate, a grid and a cathode, a second electron discharge device having a plate, a grid and a cathode, a relatively large plate load impedance connected between the plate of said first electron discharge device and a point of fixed potential, a cathode resistor connected between the cathode of said first electron discharge device and a point of fixed potential that is lower than said point of fixed potential, a capacitor connected to the cathode of said first electron discharge device, means for biasing the grid of said first electron discharge device so that it is positive with respect to said latter point of fixed potential, a direct current coupling between the plate of said first electron discharge device and the grid of said second electron discharge device, a plate load resistance connected between the plate of said second electron discharge device and a point of fixed potential, an impedance connected between the cathode of said second electron discharge device and a point of lower fixed potential, and means for biasing said second electron discharge device in such manner that it is cut off for levels of a signal applied to the cathode of said first electron discharge device that cause the grid of said first electron discharge device to draw current.

2. A circuit as set forth in claim 1 wherein an output circuit is connected so as to receive at least a portion of the voltage appearing across the load impedance of said second electron discharge device.

3. A circuit as set forth in claim 1 wherein an output circuit is connected so as to receive at least a portion of the voltage appearing across the cathode impedance of said second electron discharge device.

4. A circuit as set forth in claim 1 wherein the means for biasing the grid of said first electron discharge device is a potentiometer connected between the first mentioned points of fixed potential.

5. A circuit as set forth in claim 1 wherein the means for biasing said second electron discharge device is a resistor connected between a point of relatively positive potential and the cathode of said second electron discharge device.

6. A circuit as set forth in claim 1 wherein the means for biasing said electron discharge device includes a condenser connected in parallel with the impedance connected to the cathode of said second electron discharge device.

7. A circuit for separating synchronizing signals from a composite signal in which the synchronizing signals extend in a negative direction and beyond the rest of the signal comprising, in combination, a first amplifier having at least a plate, a grid and a cathode, a resistor connected between said cathode and a point datum reference potential, a plate load resistor connected between said plate and a point of potential positive with respect to the datum reference potential, a capacitor for coupling the composite signal to said cathode, electrical means for establishing said grid at a positive potential with respect to said point of datum reference potential, a second amplifier having at least a plate, a grid and a cathode, and a direct current coupling between said plate of said first amplifier and said grid of said second amplifier.

References Cited in the file of this patent

UNITED STATES PATENTS

| | | |
|---|---|---|
| 2,256,529 | Seeley | Sept. 23, 1941 |
| 2,363,809 | Schade | Nov. 28, 1944 |
| 2,411,695 | Rado | Nov. 26, 1946 |
| 2,713,611 | Schlesinger | July 19, 1955 |
| 2,718,554 | Person | Sept. 20, 1955 |